US010411611B2

(12) United States Patent
Perchlik et al.

(10) Patent No.: US 10,411,611 B2
(45) Date of Patent: Sep. 10, 2019

(54) VOLTAGE DISCHARGE CIRCUIT

(71) Applicant: Microsoft Technology Licensing, LLC, Redmond, WA (US)

(72) Inventors: David Perchlik, Redmond, WA (US); Monty Ross, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/477,342

(22) Filed: Apr. 3, 2017

(65) Prior Publication Data

US 2017/0288558 A1 Oct. 5, 2017

Related U.S. Application Data

(60) Provisional application No. 62/318,120, filed on Apr. 4, 2016.

(51) Int. Cl.
*H02M 1/00* (2006.01)
*H02M 1/08* (2006.01)
*H02M 3/335* (2006.01)

(52) U.S. Cl.
CPC ......... *H02M 3/33592* (2013.01); *H02M 1/08* (2013.01); *H02M 2001/0012* (2013.01); *H02M 2001/0025* (2013.01)

(58) Field of Classification Search
CPC .................................................... H02M 3/335
See application file for complete search history.

(56) References Cited

U.S. PATENT DOCUMENTS

| 6,075,352 A | 6/2000 | Kates et al. |
| 7,675,281 B1 | 3/2010 | Holt et al. |
| 2006/0007713 A1 | 1/2006 | Brown |
| 2007/0262651 A1 | 11/2007 | Odaohara |

(Continued)

FOREIGN PATENT DOCUMENTS

| CN | 101071955 A | 11/2007 |
| CN | 204089317 U | 1/2015 |

OTHER PUBLICATIONS

Abdel-Rahman et al., "Transient Response Improvement in DC-DC Converters Using Output Capacitor Current for Faster Transient Detection," *In Proceedings of IEEE Power Electronics Specialists Conference*, Jun. 2007, 4 pages.

(Continued)

*Primary Examiner* — Jue Zhang
*Assistant Examiner* — Trinh Q Dang
(74) *Attorney, Agent, or Firm* — Ray Quinney & Nebeker P.C.; Paul N. Taylor

(57) ABSTRACT

Technologies are described for an adaptable power supply that can switch between two or more output voltages. The power supply includes discharge circuitry that utilizes the secondary windings of a transformer as a discharge path when the power supply switches from a high voltage level to a low voltage level. In some embodiments, the discharge circuitry is included within a synchronous rectifier. In other embodiments, the discharge circuitry is separate from the synchronous rectifier. In still other embodiments, the power supply does not include a synchronous rectifier. Whichever embodiment is used, an output capacitor can be discharged through the secondary windings of a transformer and the transformer can store that energy for future use.

19 Claims, 9 Drawing Sheets

(56) References Cited

U.S. PATENT DOCUMENTS

| | | | | |
|---|---|---|---|---|
| 2009/0302817 A1* | 12/2009 | Nagai | .................... | H02M 3/156 323/282 |
| 2011/0095371 A1 | 4/2011 | Lu | | |
| 2012/0300520 A1* | 11/2012 | Ren | .................... | H02M 3/33592 363/127 |
| 2013/0070484 A1* | 3/2013 | Mukaibara | .............. | H02M 1/36 363/21.1 |
| 2014/0084886 A1* | 3/2014 | Causse | .................. | H02M 3/158 323/282 |
| 2015/0207420 A1* | 7/2015 | Wang | ................ | H02M 3/33507 363/21.12 |
| 2016/0190944 A1* | 6/2016 | Uchihara | .......... | H02M 3/33561 363/17 |
| 2016/0301314 A1* | 10/2016 | Polivka | ............. | H02M 3/33507 |

OTHER PUBLICATIONS

Adachi et al., "MOS-FET Synchronous Rectification with Constant Current Transformer Reset Circuit," *In Proceedings of 29$^{th}$ Annual IEEE Power Electronics Specialists Conference*, vol. 2, May 1998, 6 pages.

Alou et al., "A New Driving Scheme for Synchronous Rectifiers: Single Winding Self-Driven Synchronous Rectification," *In Journal of IEEE Transactions on Power Electronics*, vol. 16, Issue 6, Nov. 2001, 9 pages.

Lokhandwala et al., "Dual SmartRectifier™ and DirectFET® Chipset Overcomes Package Source Inductance Effects and Provides Accurate Sensing for Synchronous Rectification in DC-DC Resonant Converters," *In Proceedings of 22$^{nd}$ Annual IEEE Applied Power Electronics Conference*, Feb. 2007, 4 pages.

Maxim Application Note, Synchronous Rectification Aids Low-Voltage Power Supplies, Jan. 2001, 10 pages.

Mößlacher et al., "Improving Efficiency of Synchronous Rectification by Analysis of the MOSFET Power Loss Mechanism," Mar. 2012, 14 pages.

Polenov et al., The Influence of Turn-Off Dead Time on the Reverse-Recovery Behavior of Synchronous Rectifiers in Automotive DC/DC-Converters, *In Proceedings of 13$^{th}$ European Conference on Power Electronics and Applications*, Sep. 2009, 8 pages.

ST White Paper SRK2001, Adaptive Synchronous Rectification Controller for LLC Resonant Converter, May 2015, 22 pages.

Zhang, "Synchronous Rectification," Chapter 2 of Dissertation entitled Electrical, Thermal, and EMI Designs of High-Density, Low-Profile Power Supplies, Feb. 1998, 64 pages.

\* cited by examiner

PRIOR ART

VOLTAGE DISCHARGE CIRCUIT

CROSS REFERENCE TO RELATED APPLICATION

This application claims the benefit of U.S. Provisional Patent Application No. 62/318,120, filed Apr. 4, 2016, the disclosure of which is hereby incorporated by reference.

BACKGROUND

Power converters are becoming increasingly important in the high-tech industry. Customers are demanding increased functionality, such as differing voltage levels, higher currents, faster response times, etc. Some examples of power converters include power supplies for computer peripherals, disk drives, video game consoles, etc.

New standards for delivering power, such as Universal Serial Bus (USB) type-C, can allow for adaptable power levels. For example, devices can negotiate increased USB current through a configuration line. However, the USB specification requires that the negotiated power must be reached in 265 ms.

FIG. 1 shows a portion of a power supply compatible with USB type-C. A communications line 110 can be used to negotiate an adaptable voltage level (e.g., 5V or 20V). A micro-control unit (MCU) 120 reads the communications line 110 to determine if a request for a voltage change from high to low occurred. If so, the MCU turns on a discharge Field Effect Transistor (FET) 130 so as to discharge a power supply capacitor 140 through a resistor 150. A synchronous rectifier 160 controls a sync FET 170 and ensures that a flyback current does not pass through a transformer 180. Generally, the current flows from the transformer 180 through the sync FET 170 to charge the capacitor 140. However, the flyback current flows in the opposite direction, sometimes due to voltage spikes or other anomalies. The synchronous rectifier 160 can monitor a voltage level on a secondary winding of the transformer 180 and deactivate the sync FET 170 accordingly so as to prevent any flyback currents from occurring.

There are several problems with such a solution. First, there are multiple components needed, such as the discharge FET 130 and the resistor 150. Second, when switching from 20V to 5V in 265 ms, the current through the resistor 150 is dissipated in the circuit as heat, which is wasteful and potentially hurtful to the operation of the power supply.

Thus, there is a need for a more efficient adaptable power supply.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for an adaptable power supply that can switch between two or more output voltages. The power supply includes discharge circuitry that utilizes the secondary windings of a transformer as a discharge path when the power supply switches from a high voltage level (e.g., 20V) to a low voltage level (e.g., 5V). In some embodiments, the discharge circuitry is included within a synchronous rectifier. In other embodiments, the discharge circuitry is separate from the synchronous rectifier. In still other embodiments, the power supply does not include a synchronous rectifier.

A method can be provided for discharging an output capacitor in an adaptable power supply wherein discharging occurs using the secondary windings of a transformer.

One advantage of the discharge circuitry is that it utilizes standard power supply hardware and reduces the overall complexity of typical discharge circuits. Additionally, the discharge circuitry does not require a large discharge resistor, which are typically used for discharging voltage. Still further, heat typically caused by large discharge resistors is eliminated by using the secondary windings for discharging. For example, instead of generating heat, the energy is transferred back to the primary winding and stored for future use in a primary storage capacitor. Thus, the discharged energy is stored for future use.

As described herein, a variety of other features and advantages can be incorporated into the technologies as desired.

DETAILED DESCRIPTION

Figure 2:
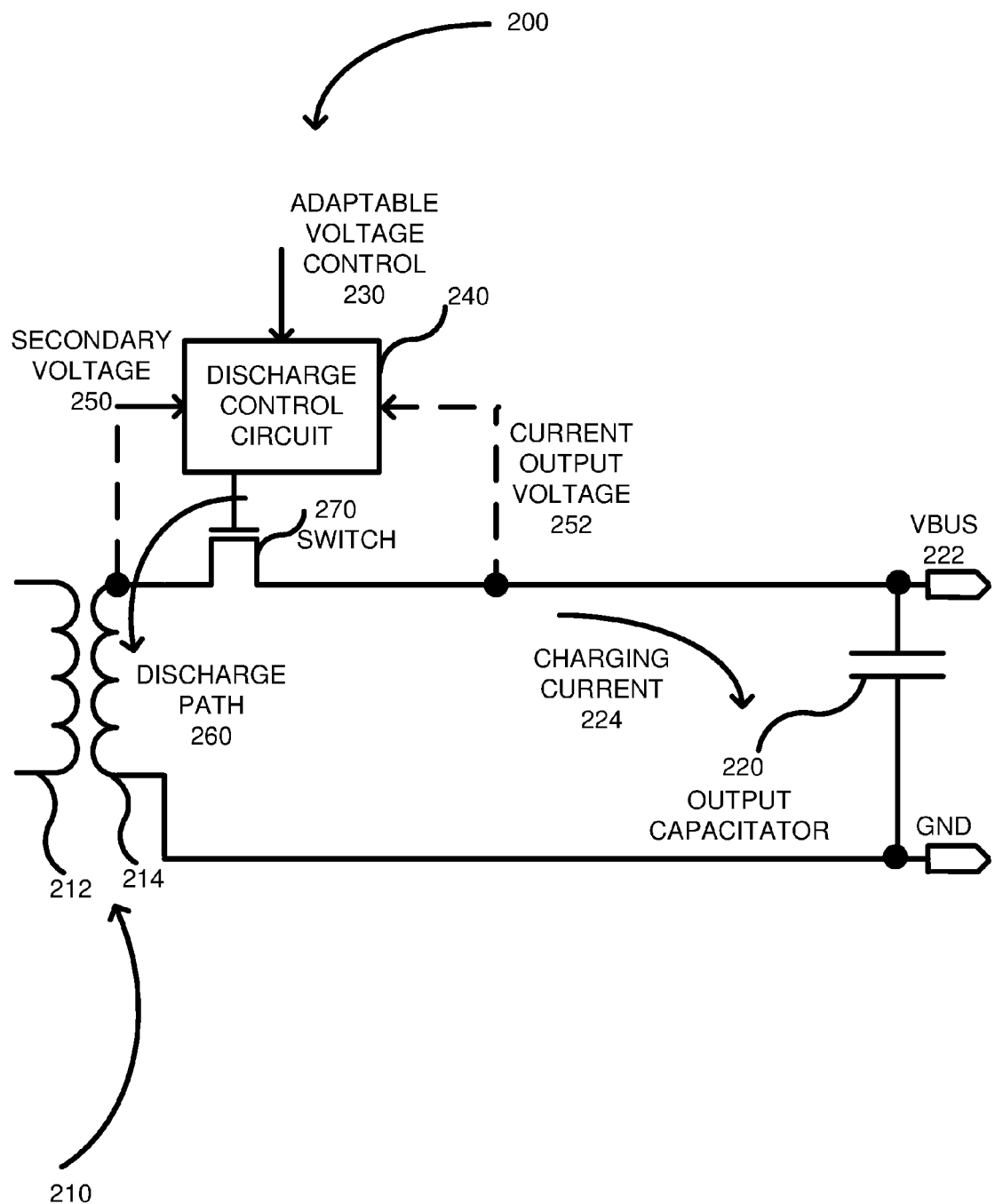
FIG. 2 is a power supply, according to one embodiment, wherein a discharge control circuit is used to activate a switch so as to discharge an output capacitor through a secondary winding of a transformer.

Overview of Power Supply Circuit with Discharge Through the Secondary Windings A power supply circuit is shown that is adaptable to supply multiple output voltages. FIG. 2 shows a first embodiment of the power supply circuit 200. A transformer 210 includes primary windings 212 and secondary windings 214. The primary windings 212 are supplied with voltage through a bridge rectifier circuit (not shown in FIG. 2, but later shown in FIG. 5). An output capacitor 220 supplies an output voltage on a voltage bus 222. Current is supplied from the secondary windings 214 through the output capacitor 220 as shown by the charging current 224 to charge the output capacitor 220. An adaptable voltage control signal 230 is supplied to a discharge control circuit 240 to indicate a desired change in voltage level on the output of the voltage bus 222. For example, the adaptable voltage control signal 230 can indicate a change from a current output voltage of 20V to a lower voltage of 5V. Other voltage levels can be used depending on the particular design. The discharge control circuit 240 can also receive inputs from the secondary windings 214, such as a secondary winding voltage 250, and a current output voltage 252, which is a voltage level associated with or equal to a voltage on the voltage bus 222. The secondary winding voltage 250 and current output voltage 252 are shown in dashed lines, as one or both can be eliminated depending on the particular implementation. The secondary winding voltage 250 is used to detect a 0V crossing in the secondary winding 214 where current is switching to an opposite direction than that shown by the charging current 224. The current output voltage 252 can be used by the discharge control circuit 240 to determine if the power supply voltage is switching from a high voltage to a low voltage, in which case a discharge path 260 is needed. By contrast, when switching from a low voltage to a high voltage, the discharge control circuit 240 recognizes that the discharge path 260 is not needed.

A switch 270 is coupled to the discharge control circuit 240 and can be used to open the discharge path 260 to discharge the output voltage on the voltage bus 222 in response to at least the adaptable voltage control signal 230. Further checks can be made, such as checking whether the current voltage is at a level that discharging is necessary. For example, a check of the current output voltage 252 can confirm that the state of the voltage bus 222 is higher than a voltage to which the power supply circuit 200 is switching. A further check can be made to ensure that the secondary voltage 250 has crossed 0V, which indicates that a flyback mode is initiated and that the discharge path 260 should stay open to fully discharge the output capacitor 220. By discharging the output capacitor 220 through the secondary winding 214, energy can be stored in the transformer 210 or in a capacitor (not shown) on the primary side of the transformer. As a result, components, such as the discharge resistor 150 (FIG. 1), can be eliminated. Additionally, the discharge path 260 results in primarily storing the energy rather than dissipation through heat. Of course, some energy loss also occurs using a transformer, but energy is also stored for future use. Additionally, less components are used in the design of FIG. 2, making it more economically advantageous.

The switch 270 can be any of a variety of semiconductor devices used to switch signals and power. An example switch is a transistor, such as a FET or a bipolar junction transistor (BJT). Other types of switches can be used. As described further below, the discharge control circuit 240 can include combinatorial logic, comparators, and analog components. The discharge control circuit 240 can also include hardware to implement functionality of a synchronous rectifier, if desired.

Discharge Control Circuit Applied to USB Type-C

Figure 1:
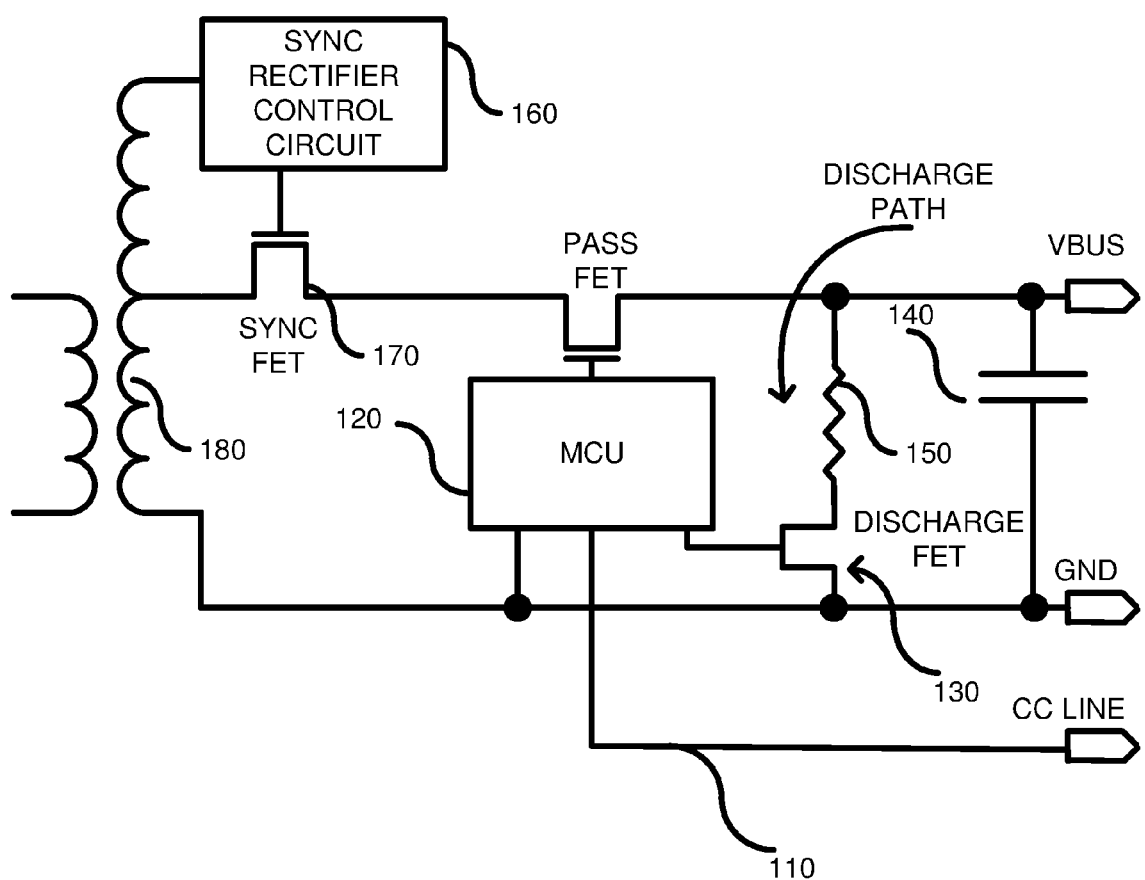
FIG. 1 is a prior-art power supply including a discharge circuit that discharges an output capacitor through a resistor.
Figure 3:
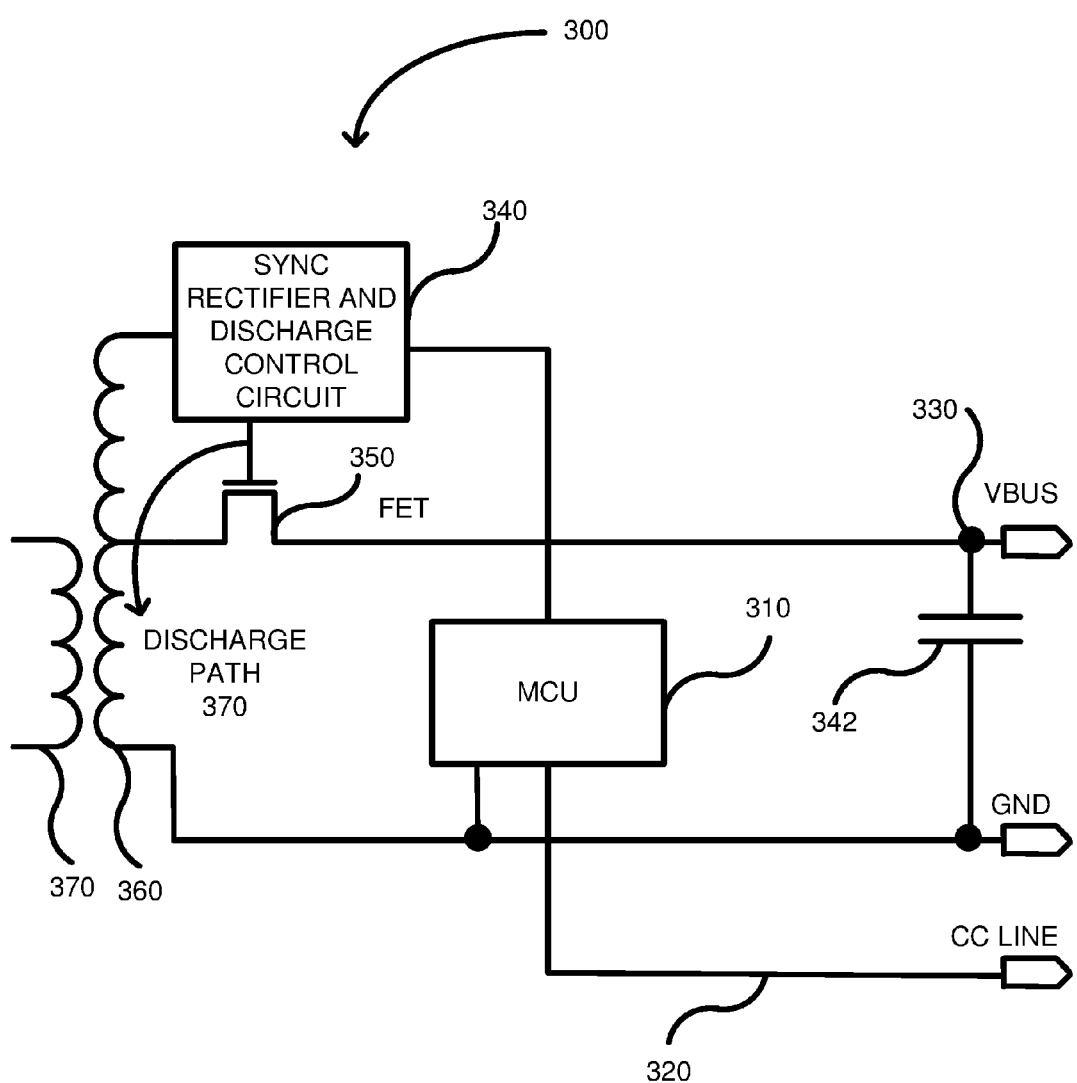
FIG. 3 is a power supply, according to another embodiment, wherein a synchronous rectifier and discharge control circuit cooperate to activate a switch so as to discharge an output capacitor through a secondary winding of a transformer.

FIG. 3 is a specific example of a power supply circuit 300 that is used for a USB type-C connector. Notably, the resistor 150, discharge FET 130 and Pass FET of FIG. 1 are not used in the FIG. 3 embodiment. The power supply circuit 300 includes a microcontroller unit (MCU) 310, but any type of controller or processor can be used, including but not limited to a signal processor, microprocessor, ASIC, or other control and processing logic circuitry. The MCU 310 monitors a control line 320 that selects between high or low voltage levels for an output voltage bus 330. The MCU 310 communicates with a combined synchronous rectifier and discharge control circuit 340 to indicate a change in voltage levels is occurring. The MCU can also communicate a current state of the output voltage bus 330, so that the circuitry 340 knows whether discharging of the output voltage bus (i.e., the capacitor 342) is required. The circuitry 340 can then control a switch 350, shown as a FET, so as to remain open for a period of time necessary to discharge the capacitor 342. There are numerous methods to control the timing. For example, the synchronous rectifier and discharge control circuit 340 can wait a predetermined period of time after receiving a state change signal from the MCU 310 to keep the FET 350 open. Alternatively, the circuit 340 can monitor the output voltage bus 330 to determine when the capacitor 342 is discharged. Still further, the circuit 340 can receive a second signal from the MCU 310 when to open the FET so that discharging no longer occurs. In each of these cases, some period of time is required to allow the switch 350 to stay closed during a flyback mode wherein discharge current is passing through a secondary winding 360 in a direction shown by arrow 370 (labeled "discharge path"). Current passing in this so-called reverse direction is typically undesirable and is prevented using the switch 350. However, in this embodiment, the switch 350 remains activated during the flyback mode so that charge from the capacitor 342 can pass back to the secondary winding 360 and then to the primary winding for storage.

Figure 4:
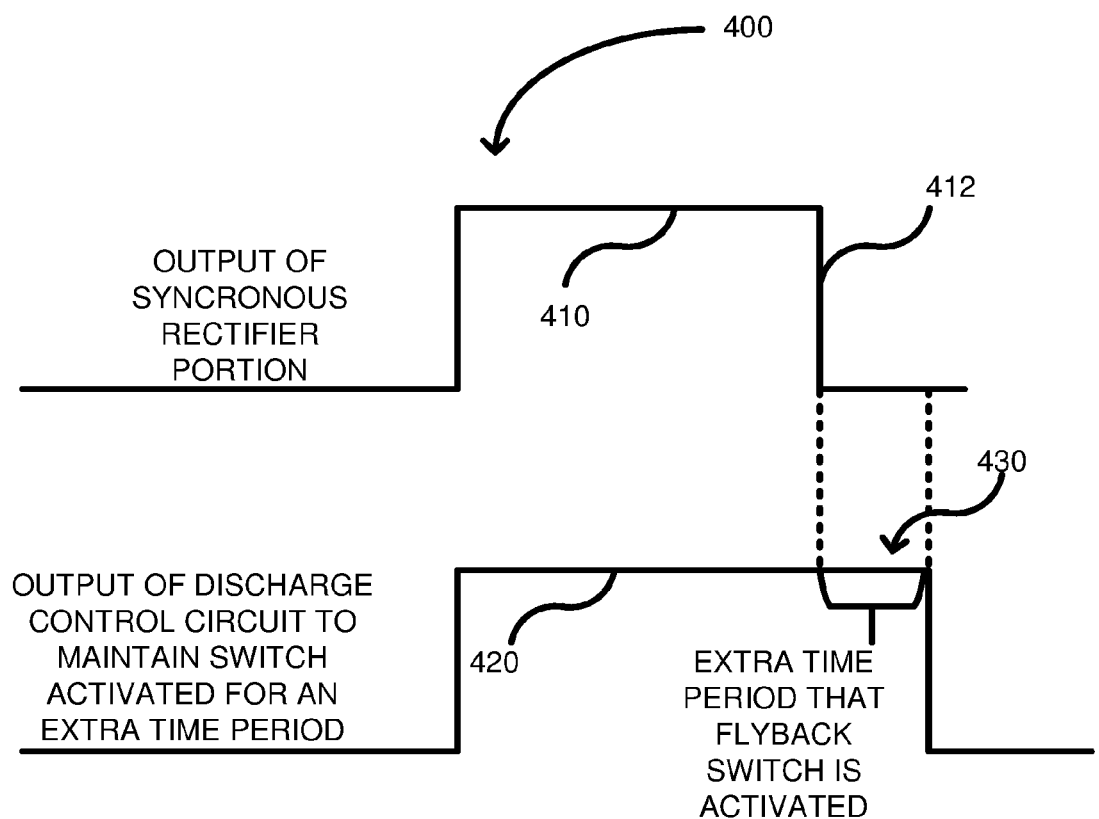
FIG. 4 is a timing circuit showing that the switch remains activated for an extra time period so as to allow the discharging of the output capacitor during a flyback mode.

FIG. 4 shows an example timing diagram 400 illustrating control of the switch 350 by the synchronous rectifier and discharge control circuit 340 of FIG. 3. As shown at 410, a synchronous rectifier portion of the circuit 340 activates the switch 350 during a period of time when the capacitor 342 is charging. However, on a falling edge 412, the synchronous rectifier portion desires to prevent a flyback mode wherein current passes through the secondary winding as shown by arrow 370. So as to override the typical operation of the synchronous rectifier portion, a discharge control circuit extends a period of time, shown at 430, that the switch 350 remains activated (i.e., closed or ON) so that the capacitor 342 can discharge. The period of time 430 can be a predetermined period of time or it can be based on monitoring the output voltage bus 330 and when that voltage drops below a threshold, the switch 350 can be deactivated to prevent any further current from passing in a reverse direction through the secondary winding 360.

Thus, the embodiment uses the existing capability of a synchronous rectification and adds the capability to discharge the output voltage on VBUS 330. Synchronous rectification is a technique for improving the efficiency of rectification by replacing diodes with actively controlled switches, such as transistors, usually power MOSFETs or power BJTs. With a change in the circuit, the synchronous rectification can be made to discharge the VBUS without the addition of the discharge FET and dissipative resistor. In particular, a synchronous rectification time period 410 is extended beyond the typical zero current crossing. The MCU 310 that is monitoring the USB Type-C communication line (CC) sends a signal to extend the conduction time beyond the zero current crossing. With the switch 350 still conducting, the current in the output capacitance 342 flows into the transformer. This energy will be stored in the magnetizing inductance of the transformer. Notably, the ability to open the switch 350 eliminates the need for the Pass FET of FIG. 1.

Figure 5:
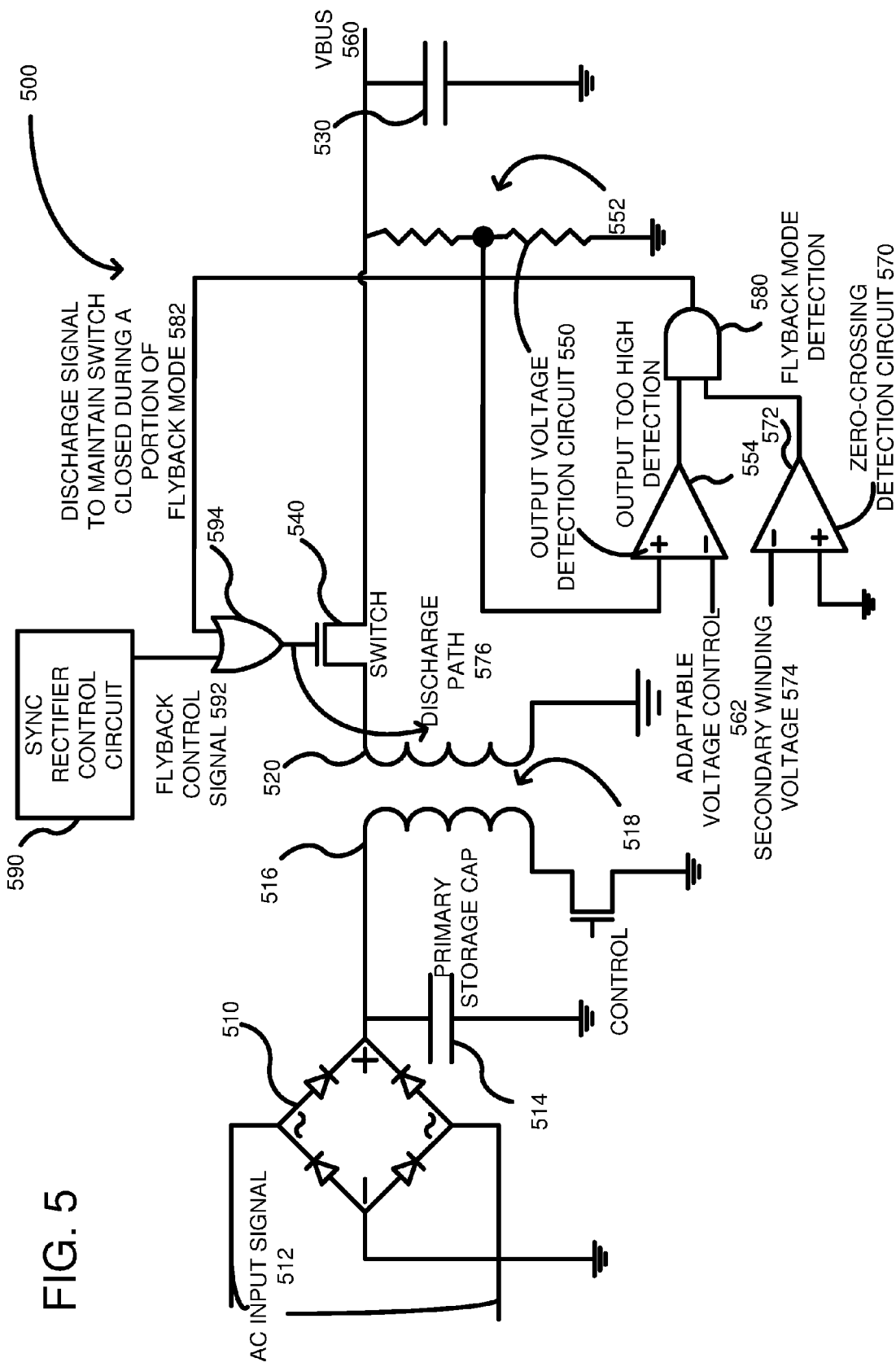
FIG. 5 is a power supply, according to another embodiment, wherein discharge control circuitry is separated from a synchronous rectifier, and wherein both cooperate to activate a switch so as to discharge an output capacitor through a secondary winding of a transformer.

Discharge Control Circuit Applied to any Adaptable Power Supply that Uses a Synchronous Rectification Circuit FIG. 5 is a power supply 500 that can include a discharge circuit usable for any adaptable power supply including synchronous rectification. In this embodiment, a bridge rectifier 510 circuit receives an AC input signal 512 and converts the signal to DC. A primary storage capacitor 514 that is coupled to the bridge rectifier 510 stores charge that can be applied to a primary winding 516 of a transformer 518. Current is induced in a secondary winding 520 of the transformer and charges an output capacitor 530 with a switch 540 closed to allow a charging current to flow. An output voltage detection circuit 550 can include a voltage divider 552 and a comparator 554. The voltage divider 552 is coupled to an output voltage bus 560 that provides an output of the power supply 500. The comparator 554 has two inputs: a positive input is coupled to an intermediate tap point in the voltage divider 552 to provide an input voltage level that is associated with the output voltage on the voltage bus 560. A second, negative input is an adaptable voltage control signal 562 that indicates whether a voltage level of the power supply 500 is switching to a different voltage level on the output voltage bus 560. The comparator 554 outputs an output-too-high signal when the output voltage is at a high level and the adaptable voltage control signal 562 indicates a switching of the voltage levels.

A zero-crossing detection circuit 570 includes a comparator 572 having a ground signal attached to one input and a secondary winding voltage 574 coupled to a second input. The comparator 572 provides a flyback detection mode output meaning that current is starting to flow through the secondary winding in a direction indicated by the arrow at 576 (labeled as a discharge path). Combinatorial logic 580 includes an AND gate that logically combines the output of the comparator 554 and the comparator 572. The output of the combinatorial logic 580 is a discharge signal 582 that is used to maintain the switch 540 activated during a portion of the flyback mode to discharge the capacitor 530. A synchronous rectifier control circuit 590 can be a standard Integrated Circuit (IC), such as the GreenChip synchronous rectifier controller available from NXP®. Such an IC can be used to generate a flyback control signal 592 to turn OFF the switch 540 when the circuit 590 detects a zero crossing in the secondary windings 520. An OR gate 594 can combine the fly-back control signal 592 and the discharge signal 582 so that the discharge signal can maintain the switch 540 activated during the flyback mode until such time as the output voltage detection circuit 550 detects that the output voltage has dropped below a predetermined threshold. At such a time, the switch 540 can be deactivated or opened to prevent further flyback currents from entering the secondary windings 520. The timing diagram of FIG. 4 is also an accurate illustration of the timing of the circuit of FIG. 5. More specifically, an output of the OR gate 594 is the same as signal 420, FIG. 4.

Figure 6:
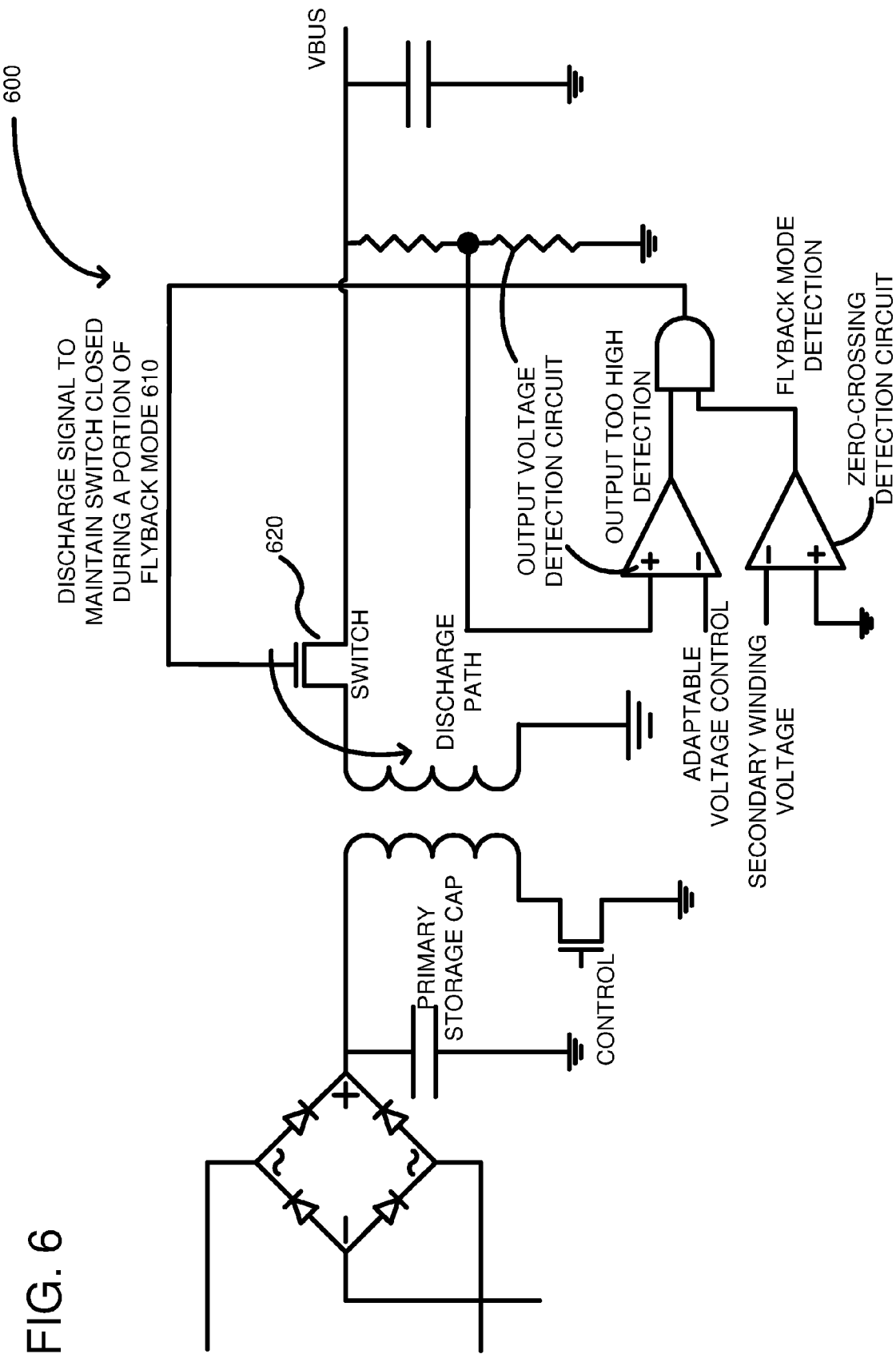
FIG. 6 is a power supply, according to another embodiment, wherein a discharge circuit is used without a synchronous rectifier.
Figure 7:
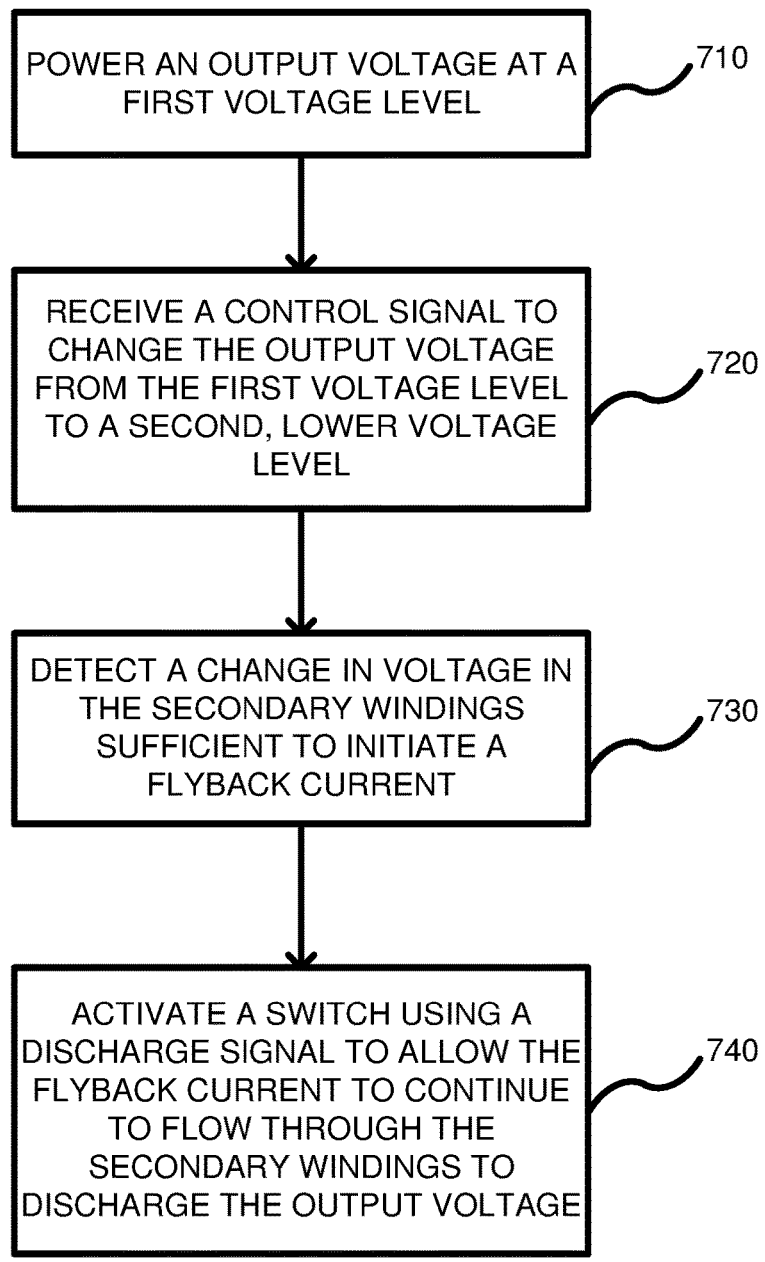
FIG. 7 is a flowchart of a method according to one embodiment for discharging an output voltage through a secondary winding of a power supply.

Discharge Control Circuit Applied to any Adaptable Power Supply without a Synchronous Rectification Circuit FIG. 6 shows a power supply 600 that can include a discharge circuit usable for any adaptable power supply that does not include synchronous rectification. In this embodiment, a bridge rectifier, a primary storage cap, a transformer, a zero-crossing detection circuit and an output detection are similar to those described above in relation to FIG. 5 and will not be described again for purposes of brevity.

However, the circuit of FIG. 6 does not include the synchronous rectifier circuit 590 of FIG. 5. Instead, a discharge signal 610 is applied directly to a switch 620 to maintain the switch closed during a portion of a flyback mode so as to discharge an output capacitor of the power supply 600. The timing of the circuit of FIG. 6 is similar to that shown at 420 in FIG. 4. Consequently, the power supply circuit can be used with synchronous rectification as in FIG. 5 or without synchronous rectification, as shown in FIG. 6. In either case, an output capacitor is discharged through the secondary windings of a transformer so as to switch an output voltage level of the power supply.

Methods for Discharging an Output Capacitor in an Adaptable Power Supply

In any of the examples herein, methods can be provided for discharging an output capacitor in an adaptable power supply. In process block 710, an output voltage is powered to a first voltage level. For example, in the embodiment of FIG. 5, current from the secondary windings 520 can flow in a first direction through the switch 540 to the output capacitor 530. The power supply can operate for any desired duration in association with process block 710. At some point, while operating, the power supply receives a control signal (process block 720) to change the output voltage from the first voltage level to a second, lower voltage level. In one example, the voltage can be changing from 10V to 3V, but any voltage levels can be used. The control signal can be a communication channel received through a cable wherein a protocol is used to determine what voltage level the power supply is switching to, such as is available in USB type-C. Other protocols and standards can be used. Similarly, there can be a plurality of possible voltage levels. Returning to the example of FIG. 5, the adapted voltage control signal 562 can be considered the control signal. In process block 730, a change is detected in voltage in the secondary windings sufficient to initiate a flyback current. The change in voltage can be detected by comparing the voltage across the secondary windings to a reference voltage. For example, in the zero-crossing detection circuit 570 of FIG. 5, the secondary winding voltage 574 is compared to a reference voltage of ground. The flyback current is generally in a direction that is opposite the first direction and is typically undesirable. However, in process block 740, the switch is activated using a discharge signal to allow the flyback current to continue to flow through the secondary windings to discharge the output voltage. If the switch is already activated when the discharge signal becomes active, then activation of the switch includes ensuring that the switch continue to be activated. The switch can be deactivated or opened after the output voltage drops below a threshold level so as to prevent further current to pass through the secondary windings. For example, the output voltage detection circuit 550 of FIG. 5 goes low after the output voltage drops. An offset can be used on the adaptable voltage control 562 to establish the threshold level. It should be noted that if the output voltage is transitioning from a high voltage level to a low voltage level, then the above described method is applied. However, if the output voltage is transitioning from a low voltage level to a high voltage level, then the switch is not activated any differently than a normal synchronous rectifier control circuit. For example, returning to FIG. 5, if the output voltage detection circuit detects that the output is already low, then the discharge signal 582 is never activated. Thus, the switch 540 is only activated for the additional period when the voltage is transitioning from high to low.

One technical impact of allowing the current to continue to flow through the switch in a flyback mode is that the primary winding of the transformer is charged using energy from discharging the output voltage. Such energy can then be further stored in a primary storage capacitor, such as is shown at 514 in FIG. 5. If there is a synchronous rectifier circuit, the discharge signal overrides any signal from the synchronous rectifier circuit so as to ensure that the switch remains activated.

Figure 8:
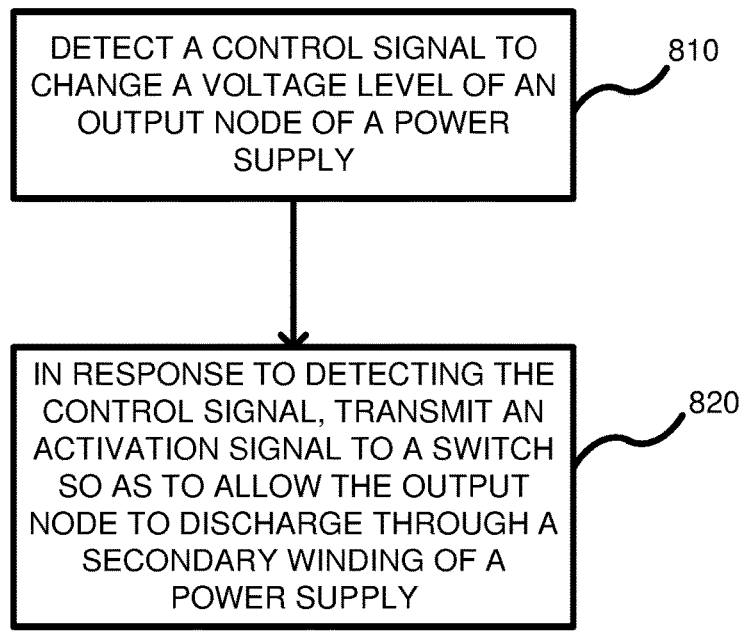
FIG. 8 is a flowchart of a method according to another embodiment for discharging an output voltage through a secondary winding of a power supply.

FIG. 8 shows a second method of discharging an output capacitor in an adaptable power supply. In process block 810, a control signal is detected requesting a change of voltage level of an output node of a power supply. The detecting can occur when a first, current voltage level is higher than a voltage level that the power supply is switching to. In process block 820, in response to detecting the control signal, an activation signal can be transmitted to the switch so as to allow the output node to discharge current through the secondary windings of the power supply. For example, in FIG. 5, the activation signal is the discharge signal 582. Additionally, as shown in FIG. 5, the activation signal can be logically combined with a flyback control signal from a synchronous rectification circuit.

Computing Systems

Figure 9:
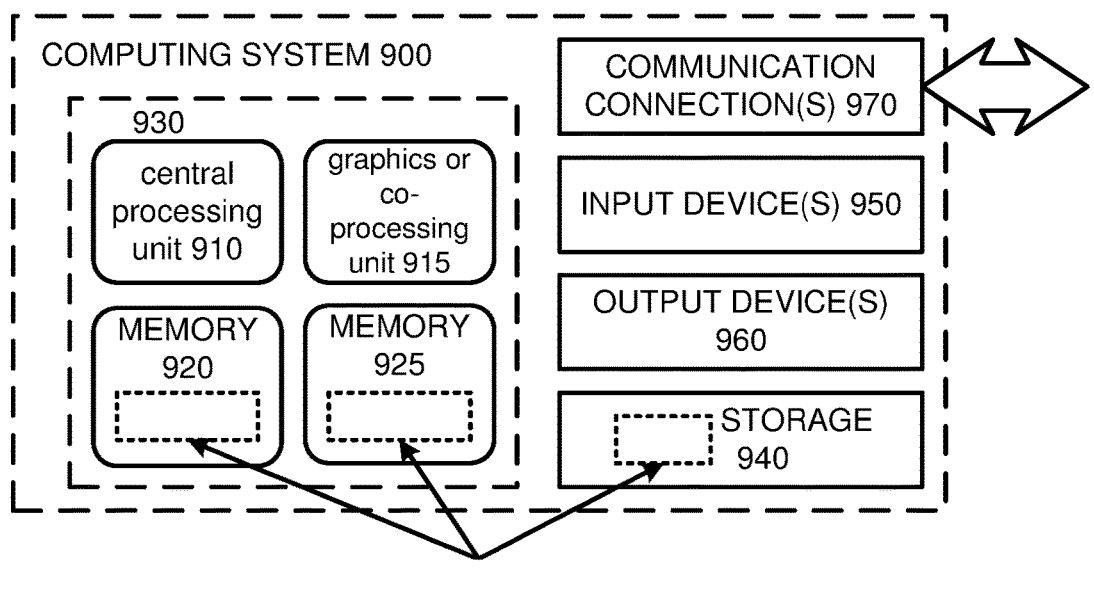
FIG. 9 is a diagram of an example computing system in which some described embodiments can be implemented.

FIG. 9 depicts a generalized example of a suitable computing system 900 in which the described innovations may be implemented. The computing system 900 is not intended to suggest any limitation as to scope of use or functionality, as the innovations may be implemented in diverse general-purpose or special-purpose computing systems. In some embodiments, the power supply can be embedded in a computer system 900. Alternatively, components of the computer system 900 can be components within the power supply.

With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. For video encoding, the input device(s) 950 may be a camera, video card, TV tuner card, or similar device that accepts video input in analog or digital form, or a CD-ROM or CD-RW that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 9, computer-readable storage media include memory 920 and 925, and storage 940. By way of example, computer-readable storage media include memory and storage. The term computer-readable storage media does not include signals and carrier waves. In addition, the term computer-readable storage media does not include communication connections.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Example Alternatives

The following numbered paragraphs provide still other alternatives that can be used to implement the embodiments herein.

1. A method changing voltage levels in a power supply, comprising:
    detecting a control signal to change a voltage level on an output node of the power supply from a first voltage level to a second voltage level; and
    in response to detecting the control signal, transmitting an activation signal to a switch between the output node and a transformer so that energy on the output node is discharged through a secondary winding of a transformer within the power supply.

2. The method of paragraph 1, wherein the detecting occurs when the first voltage level is higher than the second voltage level, otherwise the activation of the switch does not occur.

3. The method of paragraph 1 or 2, further including logically combining the activation signal with a flyback control signal from a synchronous rectifier control circuit so as to ensure that the output node is discharged through the secondary winding.

4. The method of any preceding paragraph, further including monitoring a voltage level on the output node to generate a monitoring signal and inputting the monitoring signal and the control signal into a comparator so as to generate the activation signal.

5. The method of any preceding paragraph, further including storing the energy in a primary storage capacitor after the energy passes through the transformer from the secondary winding to the primary winding.

6. The method of any preceding paragraph, further including monitoring a voltage level across the secondary winding and only transmitting the activation signal if there is a 0V crossing in the secondary winding.

7. The method of any preceding paragraph, further including monitoring the output node and when a voltage level drops below a threshold, switching the activation signal to a deactivation signal.

8. A power supply that can switch between two or more output voltage levels, comprising:
    a transformer having primary and secondary windings;
    an output voltage capacitor coupled in parallel with the secondary windings and coupled to an output node for supplying an output voltage of the power supply;
    a switch coupled between the secondary windings and the output voltage capacitor; and
    control circuitry coupled to the switch having an input signal node for receiving an input signal indicating that the output voltage of the power supply is switching voltage levels and for controlling the switch so that the output voltage capacitor discharges through the secondary windings of the transformer.

9. The power supply of paragraph 8, wherein the control circuitry includes zero-crossing circuitry that detects when the secondary windings have a threshold voltage and wherein the controlling of the switch is dependent on whether the secondary windings are at or below the threshold voltage.

10. The power supply of paragraphs 8 or 9, further including output-voltage detection circuitry that determines whether the output voltage of the power supply is above a threshold level.

11. The power supply of paragraphs 8-10, further including a synchronous rectifier control circuit coupled to the switch for deactivating the switch when a fly-back mode is detected wherein current flows back through the secondary winding from the output node.

12. The power supply of paragraphs 8-11, further including a primary storage capacitor coupled across the primary windings, wherein the primary storage capacitor is charged by the output voltage capacitor discharging.

13. The power supply of paragraphs 8-12, wherein the control circuitry switches a state of the switch when the output voltage drops below a threshold level.

14. The power supply of paragraphs 8-13, wherein the control circuitry includes a microcontroller unit.

15. The power supply of paragraphs 8-14, wherein the power supply does not discharge current through a resistor.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A method changing voltage levels in a power supply, comprising:
   detecting a control signal to change a voltage level on an output node of the power supply from a first voltage level to a second voltage level, wherein the detection includes a first comparator having a first input coupled to the output node for detecting the change to the voltage level on the output node and a second input coupled to the control signal that indicates whether the power supply is changing between the voltage levels;
   detecting a voltage level of a transformer associated with the power supply in a second comparator, wherein the second comparator has a first input coupled to a transformer output node and a second input coupled to a constant voltage level;
   combining an output of the first comparator and the second comparator to generate an activation signal; and
   transmitting the activation signal to a switch between the output node and the transformer so that energy on the output node is discharged through a secondary winding of a transformer within the power supply so as to switch the power supply to the second voltage level.

2. The method of claim 1, wherein the detecting of the control signal occurs when the first voltage level is higher than the second voltage level, otherwise the activation of the switch does not occur.

3. The method of claim 1, further including logically combining the activation signal with a flyback control signal from a synchronous rectifier control circuit so as to ensure that the output node is discharged through the secondary winding.

4. The method of claim 1, further including storing the energy in a primary storage capacitor after the energy passes through the transformer from the secondary winding to the primary winding.

5. The method of claim 1, wherein detecting the voltage level of the transformer further includes monitoring a voltage level across the secondary winding and only transmitting the activation signal if there is a 0V crossing in the secondary winding.

6. The method of claim 1, further including monitoring the output node and when a voltage level drops below a threshold, switching the activation signal to a deactivation signal.

7. A power supply that can switch between two or more output voltage levels, comprising:
   a transformer having primary and secondary windings;
   an output voltage capacitor coupled in parallel with the secondary winding and coupled to an output node for supplying an output voltage of the power supply;
   a switch coupled between the secondary winding and the output voltage capacitor;
   control circuitry including a first comparator coupled to the switch having an input signal node as a first comparator input signal node for receiving an input signal indicating that the output voltage of the power supply is switching voltage levels from a first voltage level, to a second voltage level, lower than the first voltage level and a second comparator input signal node coupled to the output node, an output of the first comparator for generating a first comparator output signal;
   a second comparator having a first input coupled to a secondary winding of the transformer and a second input coupled to a constant voltage level and a second comparator output signal; and
   logic for combining the output signals of the first comparator and the second comparator to generate a signal for controlling the switch so that the output voltage capacitor discharges through the secondary windings of the transformer to switch to the second voltage level.

8. The power supply of claim 7, wherein the second comparator operates as zero-crossing circuitry that detects when the secondary winding has a threshold voltage and wherein the controlling of the switch is dependent on whether the secondary winding is at or below the threshold voltage.

9. The power supply of claim 7, further including output-voltage detection circuitry that determines whether the output voltage of the power supply is above a threshold level.

10. The power supply of claim 7, further including a synchronous rectifier control circuit coupled to the switch for deactivating the switch when a fly-back mode is detected wherein current flows back through the secondary winding from the output node.

11. The power supply of claim 7, further including a primary storage capacitor coupled across the primary windings, wherein the primary storage capacitor is charged by the output voltage capacitor discharging.

12. The power supply of claim 7, wherein the control circuitry switches a state of the switch when the output voltage drops below a threshold level.

13. A method of discharging an output capacitor in a power supply, comprising:
   powering an output voltage at a first voltage level using a power supply having primary and secondary windings, wherein current flows through the secondary winding in a first direction;
   receiving a control signal on a first input to a first comparator to change the output voltage from the first voltage level to a second, lower voltage level;
   monitoring a voltage level of the secondary winding using a second comparator;

combining outputs of the first comparator and the second comparator;

using the combined outputs, generating a signal; and activating a switch using the generated signal to allow the current to continue to flow in a second direction through the secondary winding to discharge the output voltage through the secondary winding so as to switch the power supply to the second voltage level.

14. The method of claim 13, wherein a primary storage capacitor associated with the primary winding is charged using energy from discharging the output voltage.

15. The method of claim 13, further including initiating a fly-back control signal using a synchronous rectifier control circuit to deactivate the switch, contrary to the discharge signal.

16. The method of claim 13, wherein the primary and secondary windings are within a transformer and wherein the discharging of the output voltage through the secondary windings stores energy within the transformer using magnetizing inductance.

17. The method of claim 13, wherein the detecting of the change in voltage level includes comparing a voltage across the secondary windings to a reference voltage level.

18. The method of claim 13, further including deactivating the switch after the output voltage drops to a threshold level so as to prevent further current to pass through the secondary winding.

19. The method of claim 13, further including detecting that the output voltage is at the first voltage level and only activating the switch if the output voltage is transitioning from the first voltage level to the second, lower voltage level and not activating the switch if the output voltage is transitioning from the second, lower voltage level to the first voltage level.

* * * * *